No. 807,960. PATENTED DEC. 19, 1905.
R. M. PALMER.
SYSTEM OF ELECTRICAL DISTRIBUTION.
APPLICATION FILED DEC. 22, 1904.

Witnesses.
Inventor:
Roderick M. Palmer
by Jas. H. Churchill
atty.

UNITED STATES PATENT OFFICE.

RODERICK M. PALMER, OF CAMBRIDGE, MASSACHUSETTS, ASSIGNOR OF ONE-THIRD TO LESTER R. WILEY, OF BANGOR, MAINE, AND ONE-THIRD TO CHARLES D. SHAW, OF GREENVILLE, MAINE.

SYSTEM OF ELECTRICAL DISTRIBUTION.

No. 807,960.              Specification of Letters Patent.             Patented Dec. 19, 1905.

Application filed December 22, 1904. Serial No. 237,972.

*To all whom it may concern:*

Be it known that I, RODERICK M. PALMER, a citizen of the United States, residing in Cambridge, in the county of Middlesex and State of Massachusetts, have invented an Improvement in Systems of Electrical Distribution, of which the following description, in connection with the accompanying drawings, is a specification, like characters on the drawings representing like parts.

This invention relates to a system of electrical distribution, and has for its object to provide a system in which a current of substantially high voltage may be utilized with safety in translating devices operated by a current of substantially low voltage.

The invention is particularly well adapted for utilizing the current of an incandescent-light system for energizing the electromagnets of vibrating bells, such as commonly employed in households and other places, without danger of burning out said magnets or causing fires by the use of the high-voltage current in the house and at the same time dispensing with the use of batteries and avoiding the care and annoyance attending such use.

In accordance with this invention the circuit containing the vibrating bell or other translating device requiring for its operation a current of substantially low voltage is connected in circuit with the incandescent-light or other power circuit, and provision is made for reducing the voltage of the electric light or power current which flows through the translating device, whereby the latter may be operated from the high-voltage circuit with impunity and without affecting the translating devices in the high-voltage circuit. These and other features of this invention will be pointed out in the claims at the end of this specification.

Figure 1:
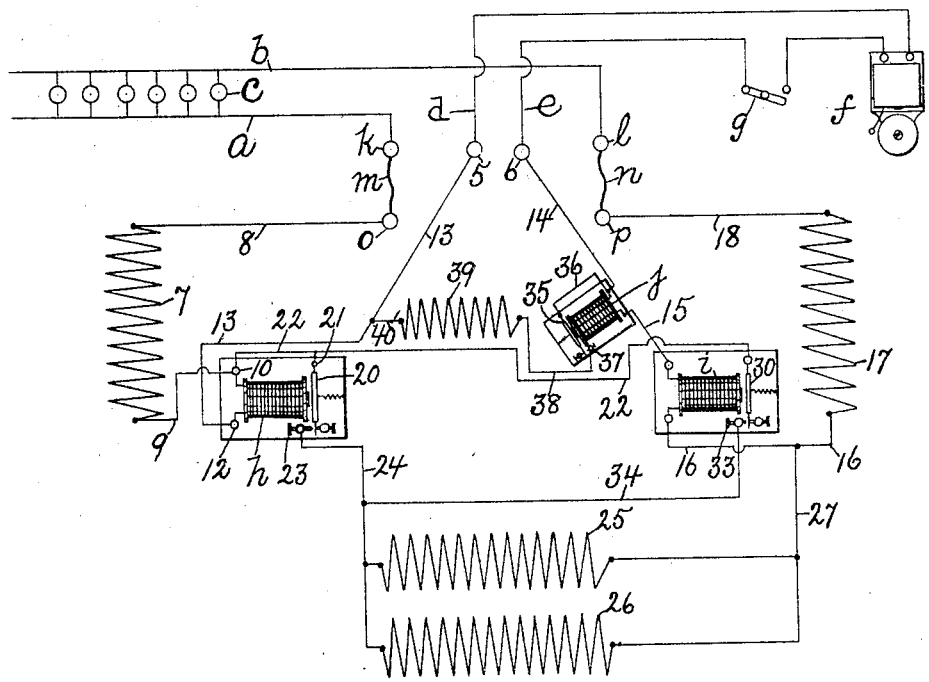
Figure 2:
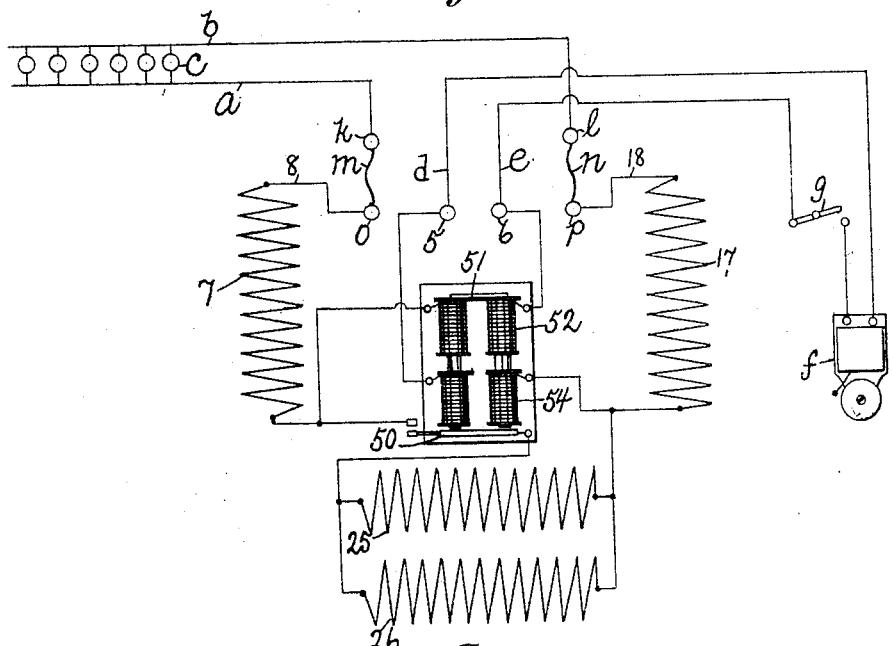

Figure 1 is a diagrammatic view of a system embodying this invention, and Fig. 2 a diagram of a modification to be referred to.

Referring to Fig. 1, $a\ b$ represent the positive and negative wires of a power-circuit—such, for instance, as an incandescent-light circuit provided with incandescent lamps $c$. In accordance with this invention the power-circuit $a\ b$ has connected with it, as will be described, a second circuit comprising the wires $d\ e$ and containing a translating device which is operated by a current of relatively low voltage, said translating device being represented as a vibrating bell $f$, of any suitable or usual construction, whose magnet (not shown) is included in the circuit $d\ e$, the latter circuit being provided with a circuit-controller, shown as a switch $g$ in the line $e$. The lines $d\ e$ are connected in circuit with the lines $a\ b$, and said circuit includes one or more translating devices, shown in the present instance as three electromagnets $h\ i\ j$, controlling branch circuits, as will be described.

As represented in Fig. 1, the line-wires $a\ b$ of the high-voltage circuit are connected to terminals $k\ l$, which are joined by fuses $m\ n$ to terminals $o\ p$, and the line-wires $d\ e$ are connected to terminals 5 6.

The circuit between the terminals $o$ 5 includes the electromagnet $h$ and a resistance 7, one end of the said resistance being connected by wire 8 to the terminal $o$ and the other end being connected by wire 9 to a binding-post 10, to which one end of the coil of the magnet $h$ is joined, the other end of said magnet-coil being connected to a binding-post 12, which is connected by wire 13 with the terminal 5. The terminal 6 is connected by wire 14 with one end of the coil of the magnet $j$, the other end of which is connected by wire 15 with one end of the coil of the magnet $i$, the other end of which is connected by wire 16 with one end of a resistance 17, which has its other end joined by wire 18 with the terminal $p$. It will thus be seen that when the switch $g$ is closed the low-voltage circuit $d\ e$ is connected with the high-voltage circuit through the electromagnets $h\ i\ j$ and the resistances 7 17, which circuit may be traced as follows: from the positive wire $a$ to terminal $k$, thence by fuse $m$, terminal $o$, wire 8, resistance 7, wire 9, magnet $h$, and wire 13 to terminal 5, thence by wire $d$, bell $f$, and wire $e$, the switch $g$ being closed, to terminal 6, thence by wire 14, magnet $j$, wire 15, magnet $i$, wire 16, resistance 17, wire 18 to terminal $p$, thence by fuse $n$, terminal $l$, and negative wire $b$ back to source of current. As soon as the circuit above described is closed at the switch $g$ the electromagnets are energized and additional paths are established for the current, so that the translating device $f$ is energized by a current of materially lower voltage and amperage, as will now be described.

The electromagnet $h$ has its armature 20 connected by wires 21 22 with the binding-post 10, and the said armature coöperates with a front stop 23, forming the terminal of a branch circuit comprising the wire 24, resistances 25 26, and the wire 27, which is joined to the wire 16. It will thus be seen that when the armature 20 is brought in contact with the front stop 23 the circuit containing the translating device $f$ is placed in shunt relation to the power or main circuit $a\,b$ and the latter circuit is completed through the resistances 25 26, which latter circuit may be traced as follows: from the positive wire $a$ to terminal $k$, thence by fuse $m$, terminal $o$, wire 8, resistance 7, and wire 9 to binding-post 10, at which point the current divides, a portion passing through the lines 22 21, armature 20, front stop 25, wire 24, resistances 25 26, wires 27 16, resistances 17, wire 18, terminal $p$, fuse $n$, terminal $l$, and negative wire $b$, and another portion of the current passes from the binding-post 10 through the magnet $h$, wire 13 to terminal 5, thence through the circuit $d\,e$ to terminal 6, thence by wire 14, magnet $j$, wire 15, magnet $i$, and wire 16, where it unites with the current flowing through the line 27. In this manner the translating device in the low-voltage circuit is operated by a current from the power-circuit without injury, and this result is obtained without appreciable drop in the power-circuit or without material effect upon the translating device in the power-circuit and without injurious effects upon the translating device or devices in the low-voltage circuit.

From the above description it will be seen that the desired result may be obtained by means of a single electromagnet, as $h$; but as a precautionary measure I may prefer to employ the additional magnets $i\,j$, the armature 30 of the magnet $i$ having connected to it the wire 22 and itself coöperating with a front stop 33, which is connected by wires 34 with the wire 24, and the armature 35 of the magnet $j$ being connected by wire 36 with the wire 14 and coöperating with a front stop 37, to which is connected by the wire 38 one end of a resistance 39, having its other end connected by wire 40 with the wire 13. It will be seen that if the magnet $h$ should fail to operate for any cause the resistances 25 26 would be included in the circuit by the armature 30 making contact with the front stop 33 and if both magnets $h$ and $i$ should fail to operate the resistance 39 would be included in circuit by the armature 35 making contact with the front stop 37.

In Fig. 2 I have shown the resistances 25 26 as controlled by the armature 50 of a magnet 51 having a differential winding, one coil 52 being connected between the resistance 7 and the terminal 6 and the other coil 54 being included between the terminal 5 and the resistance 17, so that when the armature 50 is attracted the current divides and part flows through the resistances 25 26 and the other part through the magnets and the translating device $f$.

From the above description it will be seen that the translating device in the low-voltage circuit is operated by current from a relatively higher voltage circuit without danger of the formation of arcs at the said translating device, which enables this system to be employed in houses and like places wherein batteries are now employed for ringing bells, inasmuch as by this system the bell-circuit can be connected with the incandescent-light circuit now commonly employed in houses for lighting the same, thereby dispensing with the use of batteries and the annoyance attending such use.

I have herein described the low-voltage translating device as a vibrating bell; but I do not desire to limit my invention in this respect, as the low-voltage circuit may contain other forms of translating devices operated by a current of low voltage—as, for instance, the low-voltage circuit may be an electric gas-lighting circuit, a fire-alarm, telephone, or other circuit containing translating devices operated by a current of relatively low voltage.

It will be observed that when either of the magnets $h$, $i$, and $j$ is energized the bell-circuit is placed in shunt relation to the circuit containing the resistances 25 26 or the resistance 39, with the result that the voltage, as well as the amperage, is cut down or reduced, so as to enable the current to be used with safety for operating the bell, the magnet of which may be of any usual construction and is wound for a low resistance.

I claim—

1. In a system of the character described, in combination, a circuit of relatively high voltage, a second circuit containing a translating device responsive to a current of relatively low voltage and connected with said high-voltage circuit, a branch circuit normally disconnected from said high and low voltage circuits, a resistance in said branch circuit, an electromagnet included in said high and low voltage circuits, and an armature for said electromagnet coöperating with said branch circuit to connect the said branch circuit with the high and low voltage circuits, for the purpose specified.

2. In a system of the character described, in combination, a circuit of relatively high voltage, a second circuit containing a translating device responsive to a current of relatively low voltage, a resistance connected with both circuits, an electromagnet connected with both circuits, and a branch circuit normally disconnected from the high-voltage circuit and adapted to be connected therewith by said electromagnet, substantially as described.

3. In a system of the character described, in combination, a circuit of relatively high voltage, a second circuit containing a translating device responsive to a current of relatively low voltage, a plurality of electromagnets connected with both circuits, and a plurality of branch circuits normally disconnected from the high-voltage circuit and adapted to be connected therewith by said electromagnets, substantially as described.

4. In a system of the class described, in combination, an incandescent-light circuit, a bell-circuit connected therewith, an electromagnet included in said circuits, and a branch circuit controlled by said electromagnet and adapted to be connected with said incandescent-light circuit in shunt relation to said bell-circuit, substantially as described.

5. In a system of the character described, in combination a circuit of relatively high voltage, a second circuit containing a translating device responsive to a current of relatively low voltage and connected with said circuit of high voltage, a second translating device included in said circuits, and a branch circuit controlled by said second translating device and adapted to be connected with said high-voltage circuit in shunt relation to said circuit of low voltage, substantially as described.

6. In a system of the class described, in combination, a circuit of relatively high voltage, a second circuit containing a translating device responsive to a current of relatively low voltage, and means interposed between said circuits and responsive to the current of high voltage for enabling the current from the high-voltage circuit to be used with safety on the low-voltage circuit, substantially as described.

In testimony whereof I have signed my name to this specification in the presence of two subscribing witnesses.

RODERICK M. PALMER.

Witnesses:
    JAS. H. CHURCHILL,
    J. MURPHY.